(12) United States Patent
Vlachos et al.

(10) Patent No.: US 8,769,293 B2
(45) Date of Patent: Jul. 1, 2014

(54) SYSTEMS AND METHODS FOR RIGHTS PROTECTION OF DATASETS WITH DATASET STRUCTURE PRESERVATION

(75) Inventors: Michail Vlachos, Tarrytown, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1644 days.

(21) Appl. No.: 11/867,826

(22) Filed: Oct. 5, 2007

(65) Prior Publication Data
US 2009/0094265 A1   Apr. 9, 2009

(51) Int. Cl.
*G06F 17/30* (2006.01)

(52) U.S. Cl.
USPC ........... 713/179; 713/176; 382/306; 382/309; 386/260

(58) Field of Classification Search
USPC ............ 713/176, 179; 386/260; 382/306, 309
See application file for complete search history.

(56) References Cited

U.S. PATENT DOCUMENTS

| | | | |
|---|---|---|---|
| 6,065,119 A | 5/2000 | Sandford, II et al. | |
| 6,332,030 B1 * | 12/2001 | Manjunath et al. | 382/100 |
| 6,694,303 B1 | 2/2004 | Agrawal et al. | |
| 7,055,034 B1 | 5/2006 | Levy | |
| 2004/0223651 A1 | 11/2004 | Ottesen et al. | |
| 2005/0025336 A1 * | 2/2005 | Lubin et al. | 382/100 |
| 2007/0230739 A1 * | 10/2007 | Johnson et al. | 382/100 |

OTHER PUBLICATIONS

Radu Sion, Mikhail Atallah, and Sunil Prabhakar, "Rights Protection for Categorical Data", IEEE Transactions on Knowledge and Data Engineering, Jul. 2005, vol. 17, No. 17, pp. 912-926.*
Kan Li and Xiao-Ping Zhang, "A New LUT Watermarking Scheme with Near Minumum Distortion Based on the Statistical Modeling in the Wavelet Domain", 2005, Springer-Verlag Berlin Heidelberg, ICIC 2005, Part II, LNCS 3645, pp. 742-750.*
Farid Ahmed, "A Dual Fourier-Wavelet Domain Authentication-Identification watermark", Apr. 2007, Optics Society of America, pp. 1-10.*
Agrawal et al., Watermarking Relational Databases; Proceedings of the 28th VLDB Conference, Hong Kong, China; 2002; 12 pages.
Cousot, et al., An Abstract Interpretation-Based Framework for Software Watermarking; POPL; 2004; pp. 173-185.
Jin et al., Watermarking Spatial Trajectory Database; DASFAA; 2005; 12 pages.
Kahng et al., Watermarking Techniques for Intellectual Property Protection; DAC; 1998; San Francisco, CA USA; pp. 776-781.
Sion et al., Rights Protection for Relational Data; SIGMOD; 2003; San Diego, CA USA; 13 pages.
Sion et al., Rights Protection for Discrete Numeric Streams; IEEE Transactions on Knowledge and Data Engineering; vol. 18, No. 6; May 2006; pp. 1-16.

(Continued)

*Primary Examiner* — Beemnet Dada
*Assistant Examiner* — Thomas Gyorfi
(74) *Attorney, Agent, or Firm* — Tutunjian & Bitetto, P.C.; William Stock

(57) ABSTRACT

A system and method for rights protection of a dataset that includes multiple trajectory objects includes determining an intensity power for embedding a watermarking key in a data trajectory. The data trajectory is modified to embed a watermarking key at the intensity power such that the intensity power guarantees an original pair-wise relationship between distance-based neighboring objects before and after embedding of the key such that a modified trajectory provides a watermarked version of the data trajectory.

20 Claims, 13 Drawing Sheets

(56) References Cited

OTHER PUBLICATIONS

Topkara et al.; The Hiding Virtues of Ambiguity: Quantificably Resilient Watermarking of Natural Language Text Through Synonym Substitutions; MM & Sec '06; Sep. 26-27, 2006; Geneva, Switzerland; 2006; pp. 164-174.

Uccheddu et a l., Wavelet-Based Blind Watermarking of 3D Models; MM & Sec '04; Sep. 20-21, 2004; Magdeburgo, Germany; 2004; ages 143-154.

* cited by examiner

SYSTEMS AND METHODS FOR RIGHTS PROTECTION OF DATASETS WITH DATASET STRUCTURE PRESERVATION

GOVERNMENT RIGHTS

This invention was made with Government support under Contract No.: H98230-05-3-0001 awarded by Intelligence Agencies. The Government has certain rights in this invention.

BACKGROUND

1. Technical Field

The present invention relates to rights protection and in particular to a watermarking system for a dataset containing a collection of objects, so that the relationship of the right protected (watermarked) objects does not change, hence the structure of the dataset remains the same. This means that the outcome of mining operations on the right protected data is the same as on the original data.

2. Description of the Related Art

Companies frequently outsource datasets to mining firms and academic institutions to create repositories and share datasets in the interest of promoting research collaboration. Many practitioners are reserved about sharing or outsourcing datasets, primarily because of the fear of losing the principal rights over the dataset.

Data sharing is an important aspect of scientific or business collaboration. However, data owners are also concerned with the protection of their rights on the datasets, which in many cases have been obtained after expensive and laborious procedures. The ease of data exchange through the Internet has compounded the need to assemble technological mechanisms for effectively protecting one's intellectual or pragmatic property. Two of the most prevalent techniques for safeguarding rights protection are encryption and watermarking.

Encryption obfuscates the data in such a way which renders the data unusable without a secret key, which only the legitimate owner holds and distributes. Encryption, however, is inherently a hindering factor in data dissemination. Moreover, once the encryption key is out in the open and the data unencrypted, the digital content is easily distributable. An example of the aforementioned case is the decryption of the Content Scrambling System (CSS) scheme for DVD content, which was proved to be susceptible to brute-force attacks due to its small 40-bit encryption key.

Watermarking is another technique employed in rights protection. This approach does not encrypt the data, but merely embeds a secret key into the data, slightly altering the original content, while ensuring that the important data characteristics are not distorted. Watermarking is predominantly used for image rights protection, in particular, by popular international magazines. Because such magazines have a strong Internet presence, it is very easy to fall victim to image theft. By watermarking each image and employing web crawlers, publication entities systematically check for unauthorized usage of their copyrighted images throughout Internet websites.

Other digital content that is being watermarked is audio (music) and video. For example, each of the video discs given to the Oscar jury months before the original DVD video release is individually watermarked to facilitate and conclusively indicate the source of a potential 'leak'.

Previous work such as in commonly assigned U.S. Pat. No. 6,694,303, to Agrawal et al., entitled "Method and System for Building a Naives Bayes Classifier from Privacy-Preserving data", filed Jan. 19, 2000 and incorporated herein by reference, built a Naïve Bayes classifier on perturbed data. This work attempts to reconstruct the original data distributions from the modified (perturbed) data. This approach does not work directly on the perturbed data and in addition does not guarantee identical outputs for mining operations. In "Watermarking Spatial Trajectory Database", X. Jin, Z. Zhang, D. Li: Proceedings of DASFAA 2005, a way of embedding a key in sequence data is provided, but does not provide any guarantees on the outcome of mining operation and additionally is not robust on operations such as geometric transformations, since the embedding is also done in the time domain. In general, none of the previous work provides sufficient robustness to data attacks such as geometric transformations, noise addition and so on, or addresses the issue of preservation of mining results, especially when working directly on the perturbed data.

SUMMARY

A system and method for embedding an ownership key in a database of sequences, while at the same time guaranteeing that the resulting (slightly modified) dataset will have the same underlying structure, that is, behave in a similar way to the original one is disclosed and applicable to a multitude of data mining operations (e.g., search, Nearest Neighbor classification, clustering). The present embodiments imperceptibly modify a set of sequences by embedding a secret key in the sequences, without distorting their pair-wise relationships under a certain distance function. Since the sequence relationships are not modified, a set of perturbed sequences still guarantees identical outputs under a set of data-mining operations. We achieve this by guaranteeing that nearest neighbors of the object remain unmodified. A large collection of mining operations (search, outlier detection, classification, and so on) rely on the nearest neighbors, therefore their output will not be distorted.

For example, a practitioner may have used an x dataset to demonstrate the usefulness of a certain data-mining algorithm. Now, the practitioner wishes to share the dataset with other colleagues, without relinquishing rights over the dataset. This can be achieved by embedding a secret key on each dataset object. This action will minimally modify the dataset objects, without introducing apparent visual (or audible in some cases) distortions, and the marked dataset will still exhibit identical behavior (to the original dataset) for given data-mining operations. Therefore the underlying structure (or object neighborhood) of the dataset will remain the same.

To give a few examples, this technique can be very useful for various tasks:

For database search operations, because it can guarantee that the results of a search operation (given some distance function) will be the same on the original and the protected dataset.

For data-mining and machine learning tasks, by providing guarantees on the outcome of clustering and classification tasks.

We can call the above operation Structure Preserving (SP) rights protection, for simplicity. We provide a proof of concept for this technique by employing watermarking for rights protection and by ensuring structure preservation using Nearest-Neighbor (NN) preservation on the marked dataset.

Dataset marking in accordance with the present principles has many distinct advantages and merits. For example, using the Structure-Preserving Rights Protection the outcome of various machine learning and mining methods will be the same before and after the embedding of the secret key. A methodology in one approach is to derive the proper intensity of the embedded key that guarantees structural preservation. Additionally, by embedding the ownership key in a transformed domain (e.g., Fourier or wavelet), significant robustness is achieved, such as resilience to geometric transformations (data can be rotated, translated, scaled without affecting the key detection process), noise addition, data removal, and so on.

A system and method for rights protection of a dataset including multiple objects (time-series, trajectories, images, audio) while at the same time preserving the original underlying structure and relationship between the dataset objects. The goal of this procedure is to provide a mechanism for protecting the legal owner of the dataset, while at the same time not destroying any of the dataset usability. The method embeds a secret key on the dataset and still guarantees that the outcome of many classes of data-mining or database operations (clustering, classification, search, etc.) on the original and on the protected dataset will be identical. One purpose of this disclosure is to provide a mechanism that will ease the dissemination of datasets between firms and/or academic institutions, while at the same time preserving the dataset structure and providing tangible proof about the legal ownership of the relinquished dataset.

A system and method for rights protection of a dataset that includes multiple trajectory objects includes determining an intensity power for embedding a watermarking key in a data trajectory. The data trajectory is modified to embed a watermarking key at the intensity power such that the intensity power guarantees an original pair-wise relationship between distance-based neighboring objects before and after embedding of the key such that a modified trajectory provides a watermarked version of the data trajectory.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
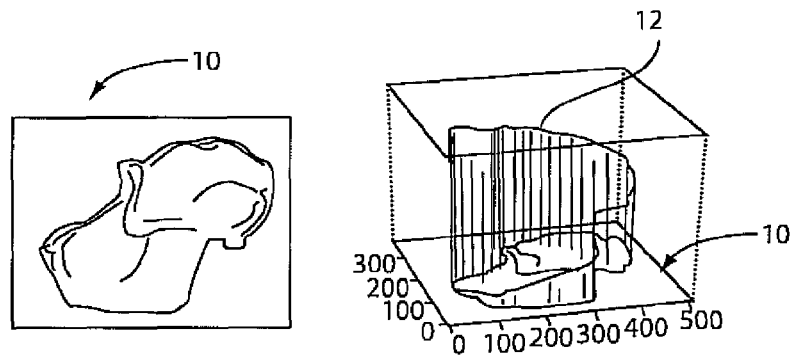
FIG. 1 shows how to create a 2-dimensional sequence from the perimeter of an image shape; similar sequences/trajectories may be used to explicate various results.

The present embodiments present a way of convincingly claiming ownership rights over a dataset of sequences, without, at the same time, destroying the salient dataset characteristics, which are important for accurate search operations and data-mining tasks. We refer to this as Structure-Preserving Rights Protection. The methodology presented distorts, imperceptibly, a collection of sequences, effectively embedding a secret key, while retaining as well as possible the neighborhood of each object, which is one important aspect for operations such as similarity search, classifications or clustering. One contribution in this methodology includes a technique for discovering the maximum distortion that still maintains such desirable properties. This is demonstrated both analytically and empirically, that the dataset marking techniques can withstand a number of attacks (such as a translation, rotation, noise addition, etc.) and therefore can provide a robust framework for facilitating the secure dissemination of trajectory datasets.

A novel watermarking system and method are provided, which are of particular interest for an array of database and data mining tasks. One goal is to watermark a dataset of objects, without affecting the neighborhood relationships of each object. That is, we wish the nearest neighbor of each object to remain the same after the watermarking process. Contrary to privacy-preserving approaches for data-mining that first add noise and then reconstruct the original data distributions based on the known noise model, the present approach learns/calculates the largest amount of noise that can be added, so that nearest neighbors are not distorted. The present embodiments embed a secret key in each of the dataset objects, distorting them imperceptibly, while taking special consideration at retaining the original neighboring object. This operation is called Neighbor Preserving (NP) watermarking. Guaranteeing preservation of the nearest objects is important for an array of search and mining operations, such as similarity search or Nearest-Neighbor (NN)-classification. Additionally, a way of providing even stronger detection accuracy is presented by sacrificing the preservation of some neighbors.

Some of the advantages of the watermarking in accordance with the present principles include that: i) one can supply tangible proof regarding ownership of a dataset; ii) presence of distortions (e.g., smoothing or noise addition) on the original dataset can be deduced by examining the correlation power of the watermark; iii) when the owner uses different keys to mark distributions of the dataset to different people, one can also decidedly identify the root of an unauthorized copy of the dataset; iv) special care is taken so that usability of the dataset is not hindered by the presence of the watermark.

The contributions in accordance with the present principles include at least the following. 1) A novel watermarking framework is presented with NN-preservation. 2) Bounds on the power of the embedded watermark are provided, so as to guarantee that the nearest-neighbor does not change for each of the watermarked objects. 3) While the naive solutions for determining the watermarking power are costly, we show efficient ways of speeding up the process making it more than 2 orders of magnitude faster, thus permitting the present technique to be applicable to large datasets. 4) The usefulness of the present techniques is presented on a variety of datasets, and also the resilience of the present scheme is shown under a wide variety of attacks.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
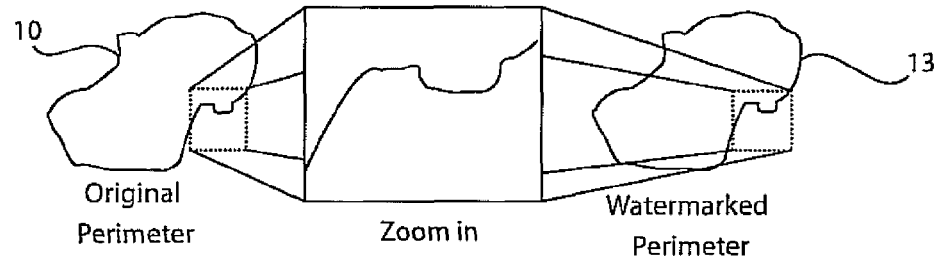
FIG. 2 is a diagram showing the original sequences/trajectory of FIG. 1 compared with the same sequence with an embedded secret key.

Referring now to the drawings in which like numerals represent the same or similar elements and initially to FIG. 1, an original image or shape 10 is shown which has its perimeter converted to a 2-dimensional sequence/trajectory 12. The present technique works by embedding the watermark in a space that is invariant to common trajectory transformations such as translation, scaling or rotation. The present embodiment invisibly marks a set of sequences (specifically 2-dimensional trajectory data (12)) without affecting the neighborhood of each object. After the dataset is marked, the owner can distribute the dataset and still maintain a provable ownership of the dataset. FIG. 2 shows a comparison of the original image 10 and a watermarked image perimeter 13. In FIG. 2, even though a very strong watermark is embedded in the zoomed-in portion 14, there are only very minute differences between the watermarked data and the original data. These differences are preferably unperceivable by an attacker.

The methods presented herein provide a guarantee that the structure of the dataset is not changed. We achieve this by guaranteeing that the nearest neighbor of each object is not altered after the watermarking, so the data recipient can still verify the original owner's findings on a wide class of search and classification tasks. This is illustrated more lucidly in the outcome of the Neighbor-Preserving watermarking model in FIG. 3.

Figure 3:
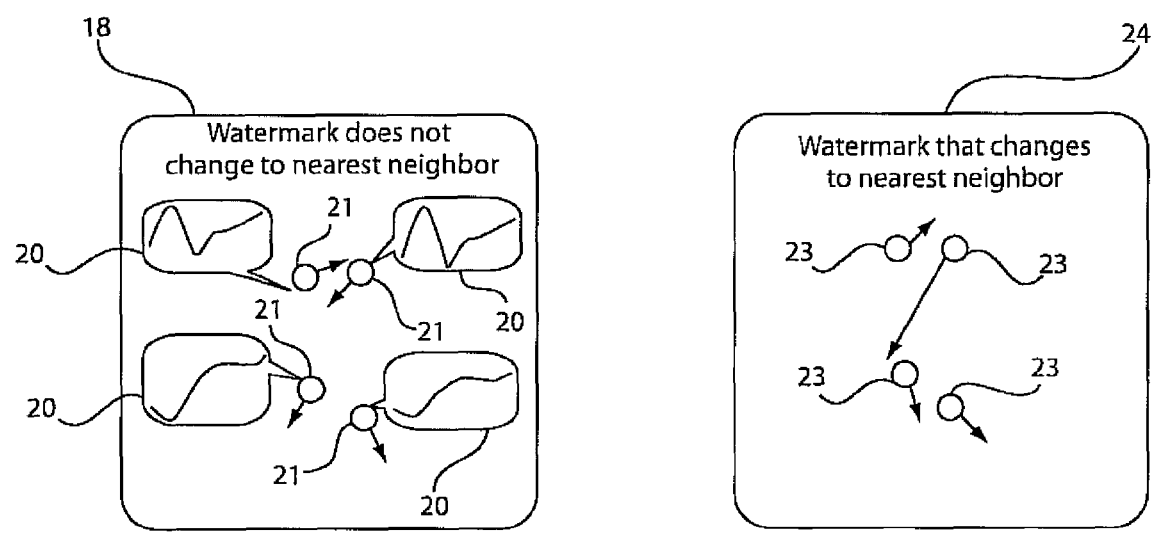
FIG. 3 is a diagram depicting objects with watermarks where a watermark which adds noise to each object but does not lose its nearest neighbor is shown, and a watermark that changes its original neighbors is shown.

Referring to FIG. 3, in accordance with one aspect, watermarks that are considered in one embodiment that do not change the nearest neighbor of the objects (area 18). A watermark 20 which adds noise to each object 21 but does not lose its nearest neighbor is illustratively shown in area 18. A watermark in objects 23 changes its original neighbors in area 24. Area 24 is provided as a point of comparison.

The watermarked dataset will return the same Nearest-Neighbor for each object under a Euclidean metric (as on the original dataset), making the present technique particularly useful for similarity search operations. Additionally, classification using the Nearest-Neighbor rule, possibly the most widely used classifier in data mining, will also not be impacted. The 1-nearest-neighbor classifier is a simple but surprisingly effective classification scheme which learns the class of an object by examining the class labels of its closest neighbor. Other instantiations of this invention could include more complex structure preservation, such as (for example) preservation of geodesic distances and others.

In accordance with the present principles, rights protection through the watermark 20 embedded in the dataset will satisfy at least some and preferably all of the following desirable properties: 1) Imperceptible; no apparent visual distortion on the dataset; 2) Detectable; the correlation distribution of the correct watermark and the watermarked data, should be sufficiently distinct from the distribution of a random key, so as to allow the conclusive determination of the watermark presence; 3) Structural neighborhood preservation; the power of the watermark embedding will be tuned in such a way so that the nearest neighbor of each object does not change after the watermarking. This means that the usability of the dataset is preserved under NN-search or NN-classification operations or other classification operations; and 4) Robust to malicious attacks.

Hereinafter, we will review the various attacks that a malicious user can perform in an effort to remove the watermark and we will demonstrate that the present principles are very robust to such alterations.

Figure 4:
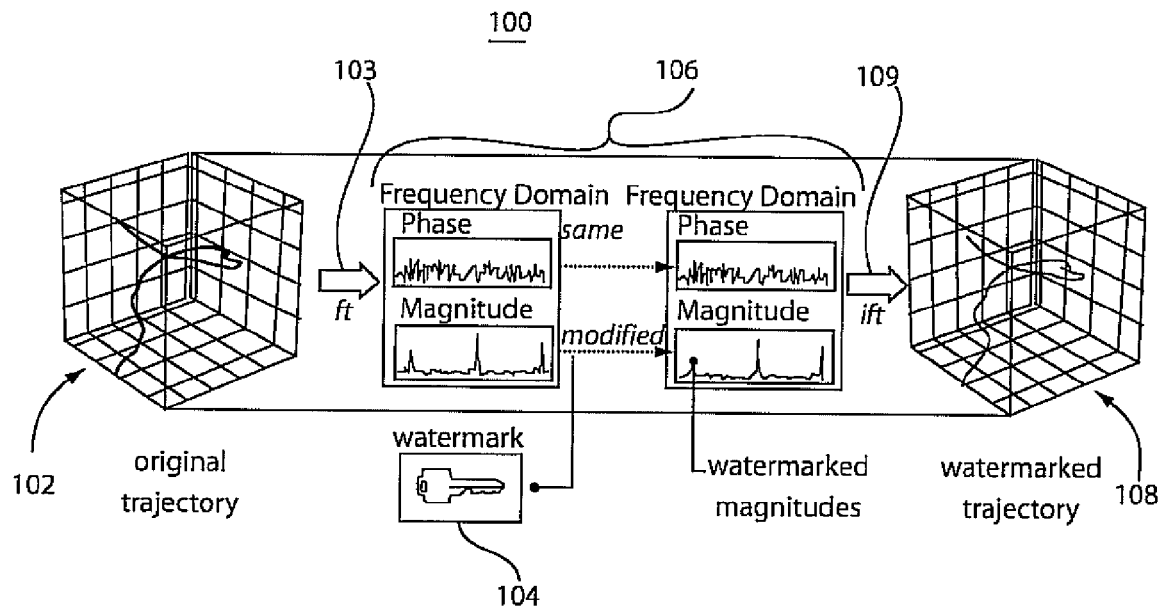
FIG. 4 is a diagram depicting a key embedding system/method in accordance with one aspect of the present principles.

Referring to FIG. 4, a system/method 100 for watermark embedding in the frequency domain is illustratively shown. A spread spectrum approach may be employed for embedding a watermark. This distributes the power of the watermark across multiple frequencies of an object and over a number of dataset objects, making its removal particularly difficult, while at the same time preserving the important data characteristics.

There are many ways to embed a secret key in an object. Here we describe a watermarking approach, although that does not exclude other implementations. We will consider an implementation using a spread spectrum approach and 2 dimensional trajectories. Embedding the watermark in one embodiment includes considering two dimensional trajectories 102. Each 2D trajectory is a vector of complex numbers $x=\{x_1, \ldots, x_n\}$, where $x_k=a_k+b_k i$ (i is the imaginary unit with $i^2=-1$), where the real and imaginary parts, $a_k$ and $b_k$, respectively, describe the coordinates of the k-th point in x. The 2D sequences utilized in this work come from a wide range of applications (video-tracking, handwriting, image contours, etc.), however everything that will be described henceforth is also applicable for any type of 1D or 2D sequence.

In each trajectory 102, a watermark 104 is embedded, which is secret information that will be hidden inside each trajectory. The watermark is encoded in a vector $W \in \{-1, 1, 0\}^n$, which has the same length of x and can take 3 distinct values. The embedding of the watermark is included in a composition function that, given x and W, returns a modified trajectory 10B which is similar to x and that encloses W.

In one embodiment, to provide better resilience from malicious attacks, the watermark 102 will not be embedded in the original Space-Time domain but into the Frequency domain 106. Every time-series x will thus be represented with the set of its Fourier descriptors $X=\{X_1, \ldots, X_n\}$ where n is the number of points of x as well as the number of its frequency components. The mappings from one domain to the other are described by the following (unitary) discrete Fourier transform dft(x)

$$X_j = \frac{1}{\sqrt{n}} \sum_{k=1}^{n} x_k \exp\left(-i\frac{2\pi}{n}(j-1)(k-1)\right)$$

and the inverse discrete Fourier transform idft(X):

$$x_j = \frac{1}{\sqrt{n}} \sum_{k=1}^{n} X_k \exp\left(i\frac{2\pi}{n}(j-1)(k-1)\right).$$

Every coefficient $X_j$ can be described in terms of its magnitude $\rho_j$ and phase $\phi_j$, that is, $X_j=\rho_j e^{\phi_j i}$. An additive embedding of the watermark may be employed which alters only the magnitudes but retains the original phase. The Fourier Transform (ft) is carried out in block 103.

DEFINITION 1 (KEY EMBEDDING)

For a trajectory $x \in C^n$ and a watermark $W \in R^n$, the key embedding generates a watermarked trajectory $\hat{x}$ by replacing the magnitudes of each Fourier descriptor of x with a watermarked magnitude $\hat{\rho}_j$:

$$\hat{\rho}_j = \rho_j(1+pW_j)$$

where power p>0 specifies the intensity of the watermark.

Using the modified magnitudes $\hat{\rho}_j$ and the original phases $\phi_j$, we go back from the frequency domain to the time domain and reconstruct the watermarked sequence using the inverse discrete Fourier transform (ift) in block 109.

One would like to embed the key in the important frequencies of the sequence. For the trajectories that we consider in this work the low frequencies (first Fourier descriptors) capture accurately the basic shape of an object.

Figure 5:
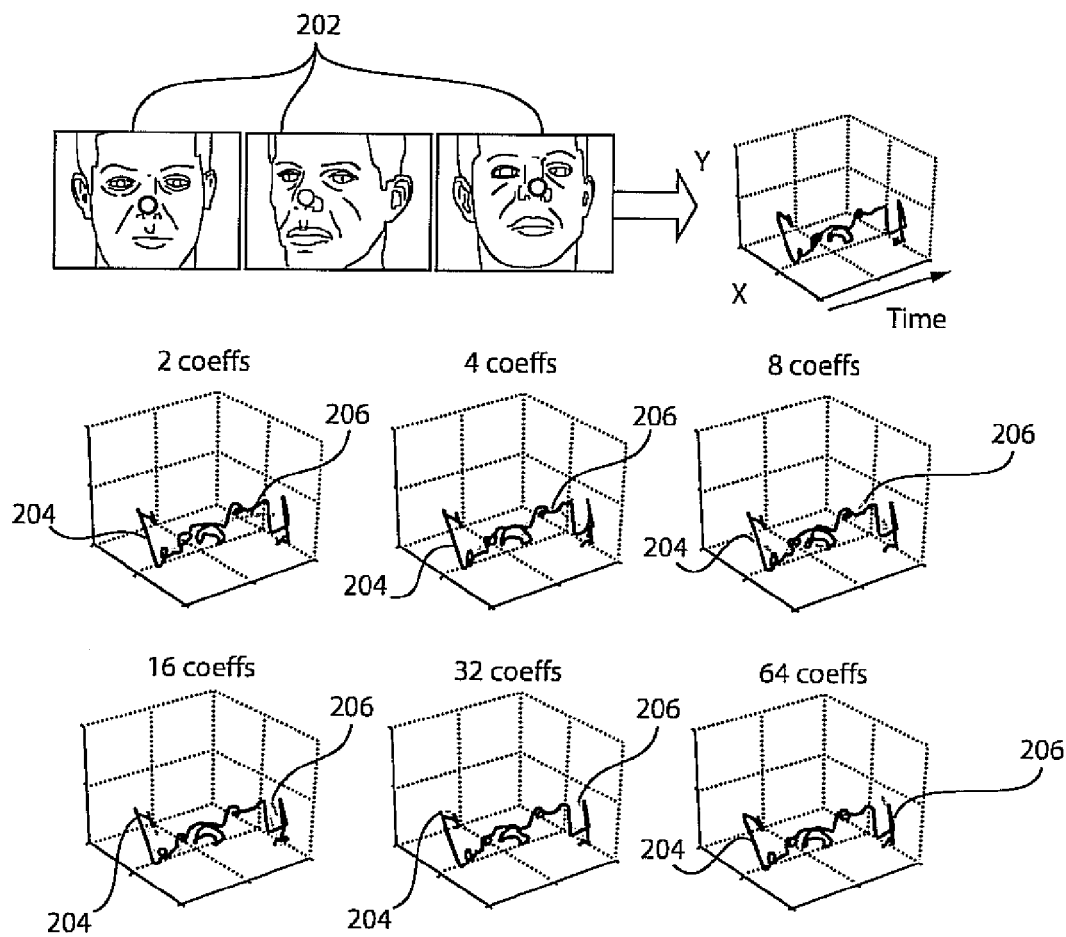
FIG. 5 is a trajectory reconstruction for video tracking applications showing the reconstruction using different numbers of Fourier coefficients (first 2-64 coefficients) where gray contours show an original trajectory and black contours show its reconstruction.

Referring to FIG. 5, a reconstruction of a trajectory from video tracking images 202 is shown, using the first 2 to the first 64 Fourier coefficients (coeffs). The trajectories in these dataset are obtained by tracking the position of a body feature (e.g., a nose) over time. It is apparent that the low frequency descriptors can describe very effectively the overall shape. Similar results are obtained for the other datasets as well. Since a potential attack cannot significantly alter the overall shape of the time-series without affecting its usability or appearance, it is generally expected that by embedding the watermark in the low frequencies, a significant resilience to malicious attacks is provided. In FIG. 5, contours 204 (black lines) show the original trajectories and contours 206 (grey lines) show the reconstructed trajectories.

Driven by these considerations, focus will be applied to embedding the watermark in the lowest frequencies. However, it may be preferred not to embed any portion of the watermark on the first Fourier descriptor $X_1$ (the DC component), since it captures the center of gravity of the trajectory $$x\left(X_1 = \sum_j \frac{x_j}{\sqrt{n}}\right)$$

and it is therefore easily susceptible to attacks. For example, a simple translation will change the center of gravity of x (and the DC component) without affecting its shape, but it will erase this part of the watermark. Therefore, the watermark will be embedded into the $2^{nd}$ and up to the $(l+1)^{th}$ Fourier descriptor. Then, the watermark W is formally defined as follows:

$$W_j = \begin{cases} 0 & \text{if } j = 1 \text{(DC component)} \\ \{-1, 1\} & \text{if } 2 \leq j \leq l+1 \\ 0 & \text{if } l+2 \leq j \leq n \end{cases}$$

with $\Sigma W_j=0$.

Therefore, the user does not need to record the whole vector W but only the l values after the first Fourier descriptor.

In Table 1, we summarize some of the symbols and notation used herein:

TABLE 1

Notation

| Symbol | Description |
| --- | --- |
| $D$ | Original dataset of trajectories |
| $\hat{D}$ | Watermarked dataset |
| x | Sequence in time-domain |
| X | Sequence in frequency domain |
| n | Number of points in a sequence |
| $X_j = \rho_j e^{\phi_j i}$ | Fourier descriptor as a function of its magnitude and phase |
| p | Embedding power |
| $\hat{X}_j = \hat{\rho}_j e^{\hat{\phi}_j i}$ | Watermarked Fourier descriptor as a function of its watermarked magnitude and phase |
| $\mu_j(D)$ | Mean of $\rho_j$ across the trajectories in D |
| l | Number of non-zero elements of watermark |
| $\chi$ | Correlation |
| $\hat{D}_p(x, y)$ | Distance between two trajectories x, y when watermarked using power p |

Various datasets are utilized herein to demonstrate the present watermarking techniques, including video-tracking datasets, handwriting trajectories, and image contours.

Resilience of Embedding:

Potential attacks in a trajectory watermarking scheme include global rotation or translation of the objects, which do not change the relative position of the objects; therefore classification schemes or search operations are not impacted. Additionally, global translations only affect the first frequency component, where no part of the watermark is embedded. In addition to geometric transformations, the resilience of the present scheme will be demonstrated for additional attacks, such as noise addition, decimation, and so on.

Error Introduced by the Watermark:

Altering a time series to embed a watermark adds some noise in the dataset. This noise may be measured as the relative error e introduced in a given trajectory x:

$$\varepsilon(x, \hat{x}) = \frac{\|x - \hat{x}\|}{\|x\|}$$

where, $\|\cdot\|$ signifies the $L_2$ norm of a vector. Due to Parseval's and after some algebraic manipulations, it is easy to see that:

$$\|x - \hat{x}\|^2 = \|x - \hat{x}\|^2$$
$$= \|\rho - \hat{\rho}\|^2 + 2\sum_j \rho_j \hat{\rho}_j [1 - \cos(\varphi_j - \hat{\varphi}_j)]$$
$$= \|\rho - \hat{\rho}\|^2$$
$$= \|\rho - \rho(1 + pW)\|^2$$
$$= p^2 \|\rho W\|^2$$

since $\phi_j = \hat{\phi}_j$
and therefore:

$$\varepsilon(x, \hat{x}) = p \frac{\|\rho W\|}{\|x\|}$$

Watermark Detection:

A watermark detection step measures the correlation $\chi$ between the watermarked magnitudes $\hat{\rho}$ and the watermark W:

$$\chi(W, \hat{x}) \equiv W \times \hat{\rho} = \sum_j W_j \hat{\rho}_j$$

Since we are dealing with a collection of trajectories, we detect the presence of a watermark by measuring its average correlation across all sequences of the watermarked dataset, as follows:

DEFINITION 2 (DIRECT WATERMARK DETECTION)

Let $\hat{D}$ be a watermarked dataset and let W be the watermark. The correlation between $\hat{D}$ and W is given by:

$$\chi(W, \hat{D}) \equiv \sum_{\hat{x} \in \hat{D}} \chi \frac{(W, \hat{x})}{|\hat{D}|}$$
$$= \sum_{\hat{x} \in \hat{D}} \sum_j \frac{(W, \hat{\rho}_j)}{|\hat{D}|}$$
$$= \sum_j W_j \sum_{\hat{x} \in \hat{D}} \frac{\hat{\rho}_j}{|\hat{D}|}$$
$$= W \times \mu(\hat{D})$$

is the vector of average magnitudes $\hat{\rho}_j$ of the trajectories in the dataset $\hat{D}$.

Figure 6:
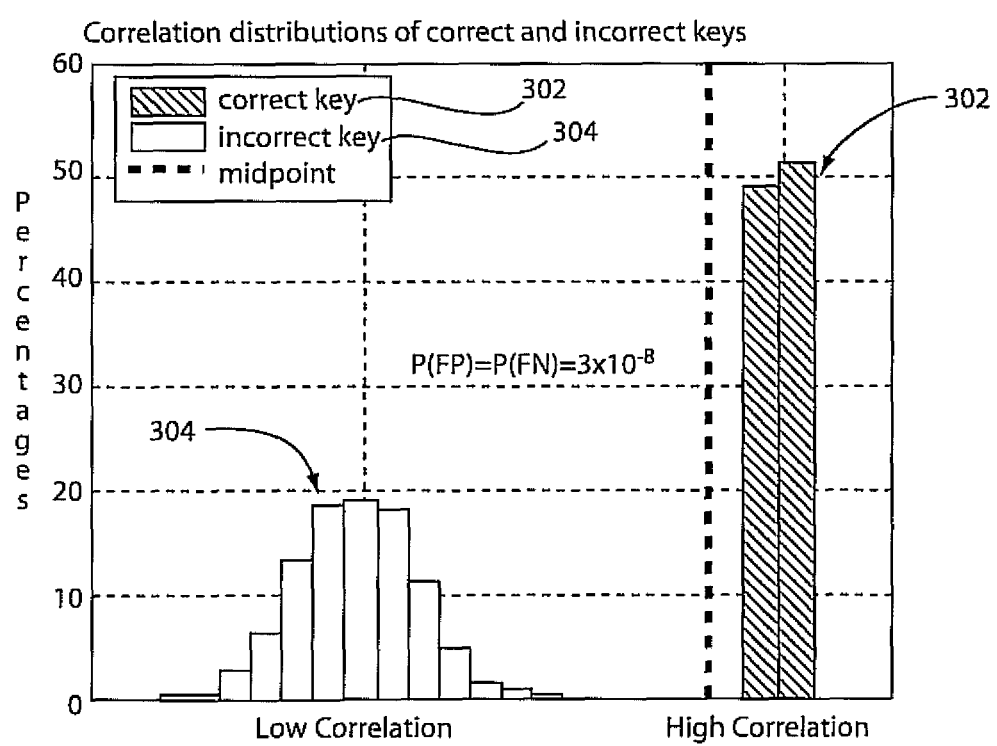
FIG. 6 correct and incorrect key empirical correlation distributions are shown to permit recognition of a watermark key based on false positives (PN) and false negatives (FN)

FIG. 6 illustratively depicts correlation distributions of correct and incorrect keys. Correct (302) and incorrect (304) watermark empirical correlation distributions are shown where the dataset ($\hat{D}$) is for a video-tracking application.

Given a watermarked dataset $\hat{D}$ and a watermark W, the larger the correlation between the two, the higher the probability that W was the actual embedded watermark. We say that that W has been embedded in $\hat{D}$ if $\chi(W, \hat{D}) \geq w$, for a given threshold w.

In one example, the value of w may be set empirically as follows. Given a dataset watermarked with a random watermark W, we measure its correlation with W and with other 500 distinct incorrect watermarks W'. We repeat this experiment for 500 different W's and this results in two probability distributions, correct distribution 302 and incorrect distribution 304. We denote with α the empirical correlation distribution of the correct key and with β the wrong key's empirical correlation distribution. The more these distributions are separated the better we can detect the presence of the watermark. In FIG. 6, we use a large embedding power to illustrate the detection process; for smaller powers, the distributions will be less clearly separated.

One ideal value of w is the one such that every correlation value in the correct watermark distribution α is larger than w and every other value in the β distribution is smaller. If the correlation of a wrong watermark is larger than w, we have a false positive, and a false negative in the symmetric case. We measure the goodness of the watermarking detection with its false positive and false negative rate.

Giving the same importance to false negatives and false positives, one can choose as an appropriate threshold, the value of w that is exactly in the middle of the two distributions, when the two distributions are properly normalized, e.g., w is such that:

$$\frac{\text{mean}(\alpha) - w}{std(\alpha)} = \frac{w - \text{mean}(\beta)}{std(\beta)}$$

Since $\alpha$ and $\beta$ exhibit strongly Gaussian distributions, we can measure the false positive (FP) and negative probabilities (FN) as follows:

$$P(FP) = \frac{1}{std(\alpha)\sqrt{2\pi}} \int_{w}^{+\infty} \exp\left(-\left(\frac{\chi - \text{mean}(\alpha)}{std(\alpha)\sqrt{2}}\right)^2\right) d\chi$$

and:

$$P(FN) = \frac{1}{std(\beta)\sqrt{2\pi}} \int_{-\infty}^{w} \exp\left(-\left(\frac{\chi - \text{mean}(\beta)}{std(\beta)\sqrt{2}}\right)^2\right) d\chi$$

That is, w is the probability point, such that P(FP)=P(FN).

Figure 7A:
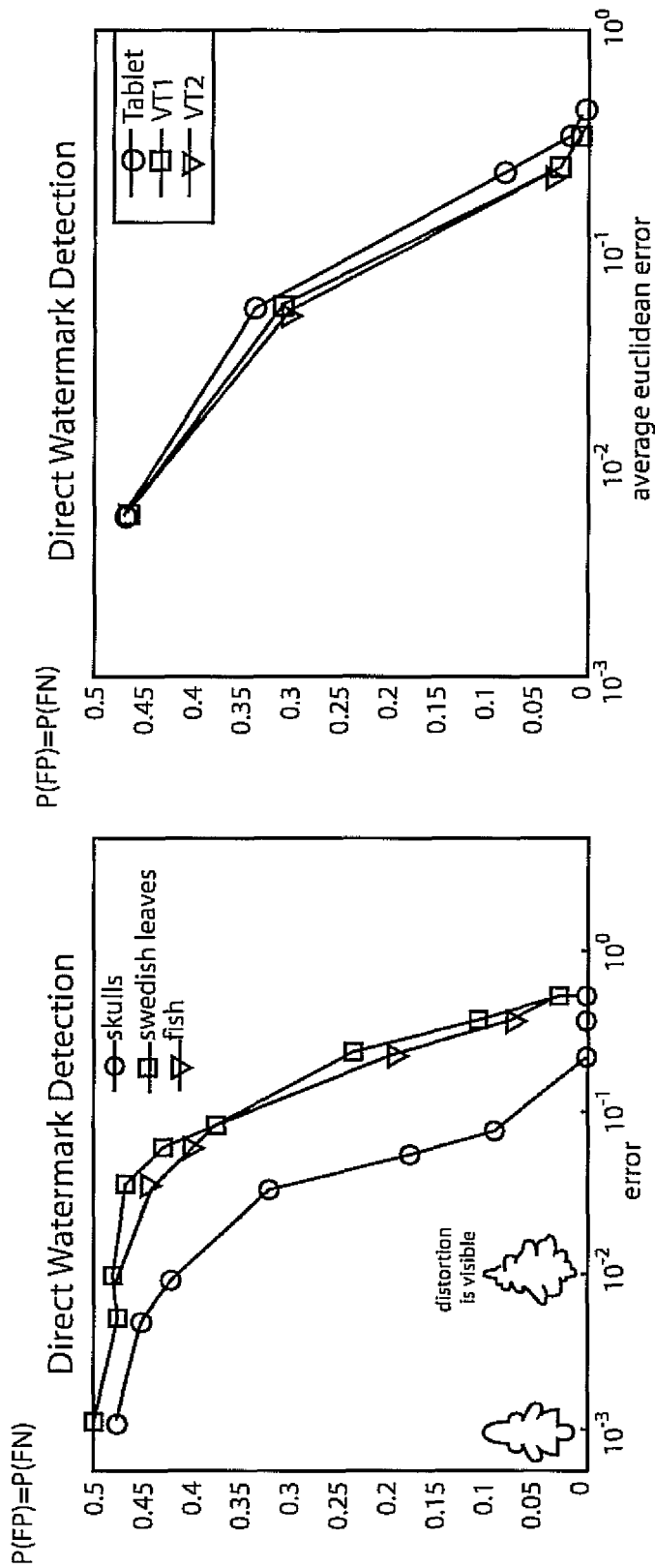
FIG. 7A shows ease of watermark detection versus introduced error (distortion error and Euclidean error) for direct additive watermarks where lower values on the y-axis indicate better detectability.
Figure 7B:
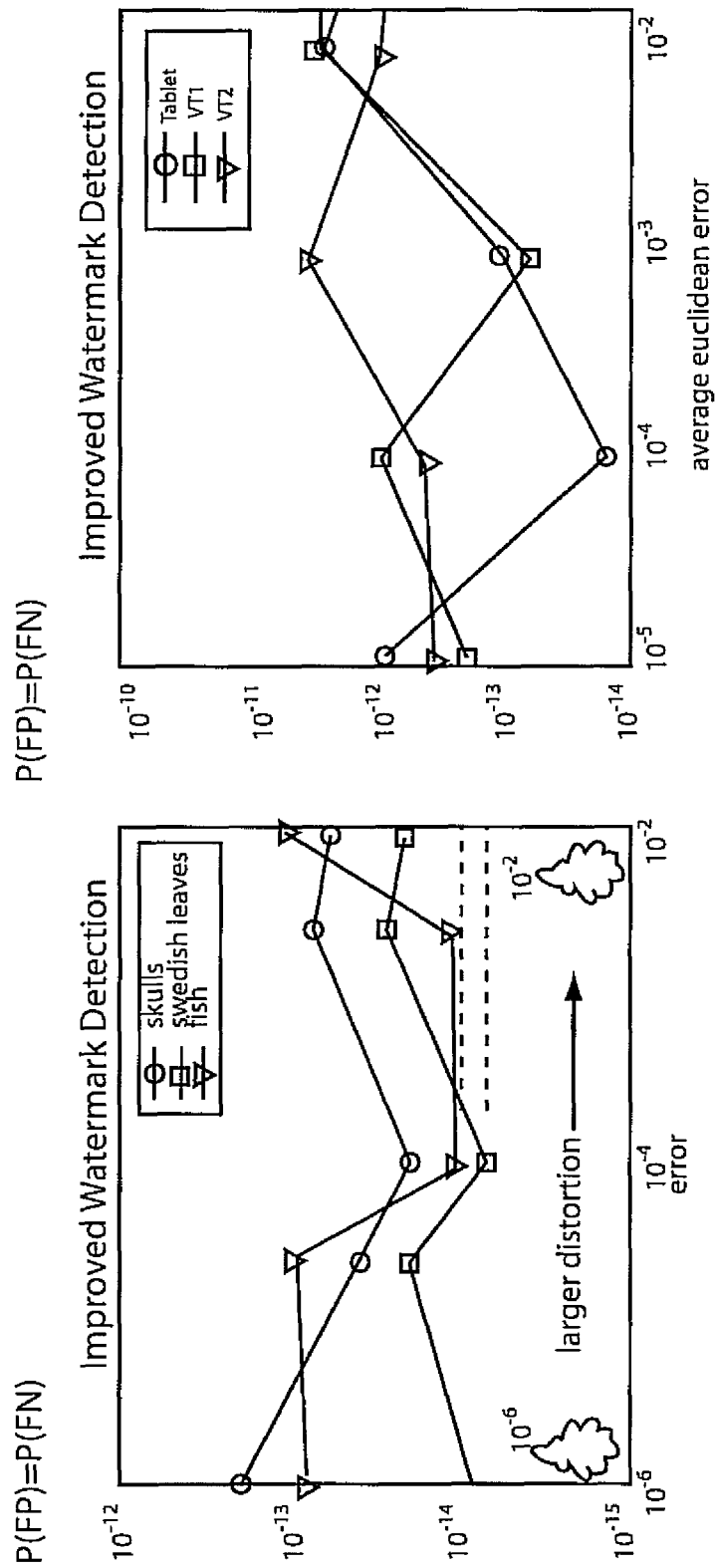
FIG. 7B shows ease of watermark detection versus introduced error (distortion error and Euclidean error) for improved watermarks where lower values on the y-axis indicate better detectability.

Referring to FIGS. 7A and 7B, easiness of watermark detection versus introduced error is illustratively depicted. Lower values on y-axis indicate better detectability. FIG. 7A shows a direct additive watermark. In FIG. 7A, the values of P(FP)=P(FN) are shown for different datasets and for different watermark embedding powers. At the bottom of the graph we also show an example of the distortion at the introduced relative error level, for an object of the "leaves" dataset. Note that for a relative error $\epsilon = 10^{-2}$ (of the original compared to the watermarked sequences), we have high false positive/negative rates (close to 45%). However, even at this point the object starts to get distorted. This means that the current detection technique needs the embedding of a very strong watermark to become easily separable from a random watermark.

Improved Watermark Detection: The direct additive watermarking technique as shown in FIG. 7A may not be effective, since it requires a large amount of embedding power that also introduces a significant distortion on the objects. Since our goal is to minimize distortion (that is, use a small embedding power), then every set of magnitudes $\hat{p}$ is dominated by the original level of average magnitudes $\mu(D)$, which, in a sense, behave like a background noise, masking the embedded watermark pW we want to discover. To overcome this difficulty, we record $\mu(D)$ during the embedding process and remove this sort of bias before the detection takes place. The correlation between $\hat{D}$ and W is thus defined as follows:

DEFINITION 3 (IMPROVED WATERMARK DETECTION)

Let $\hat{D}$ be a watermarked dataset and let W be the actual watermark. The correlation between $\hat{D}$ and W given the average magnitudes in the original dataset $\mu(D)$ is:

$$\chi|_{\mu(D)}(W, \hat{D}) = \left(\frac{\mu(\hat{D})}{\mu(D)} - 1\right) \times W$$
$$= \left(\frac{\mu(\hat{D}) \times (1 + pW)}{\mu(D)} - 1\right) \times W$$
$$= (pW) \times W$$

Since the correlation of any other watermark W'≠W will have smaller correlation (pW)×W', the original watermark will be easily detectable for arbitrarily small embedding power.

In FIG. 7B, we can see the effectiveness of this approach. We are able to easily detect the watermark even for very low embedding powers. Notice that even when the introduced error is in the order of $10^{-3}$, we can achieve an extremely low false positive rate of about $10^{-13}$. The cost for such an effective detection process is to store, together with the watermark W, the vector $\mu(D)$. This cost is very small if we consider that we only need to store 1 additional real values.

Structure-Preserving Rights Protection:

Given a technique that allows the embedding of a secret key in each of the dataset objects (such as the one described previously), now one has to tune the intensity of the watermark embedding, so as to guarantee that the relationships between the objects do not change after the addition of the secret key. Structure Preserving (SP) Rights Protection has as one of its goals to preserve the local neighborhood structure of the dataset. One way of achieving this is by preserving the nearest neighbors of each object. Here, we demonstrate how to preserve the 1-Nearest-Neighbor (1-NN) of each object after the embedding of the secret key. This procedure can also be extended to k-Nearest-Neighbor preservation, preservation of geodesic distances, and so on. By retaining the neighborhood of each object, the marked dataset does not lose its usability under many mining operations, and will return identical results (as the original dataset) for operations such as nearest-neighbor search, nearest neighbor classification, clustering, dendrogram creation, spanning tree creation, etc. We illustrate some of these tasks hereinafter.

The proper embedding power p will provide at least three desirable outcomes: —Minimization of visual distortion. This will be achieved by inducing an upper bound on the watermark embedding power (pmax); —High detectability. This is fulfilled by setting a lower bound on the watermark embedding power (pmin), which guarantees high detectability for the embedded watermark; and —Dataset structure Preservation. The present methods will properly tune the embedded key power between the aforementioned lower and upper bounds, to guarantee identical dataset structure (in the form of nearest neighbors) for each object (under a specific distance function) for both the original and the marked dataset.

For all our experiments, we illustratively permit a relative distortion of 1%, because of the watermark embedding, since we do not want to substantially distort the shape of the object. Therefore, set pmax=$p_{10}^{-2}$ (i.e., the power that introduces at most a 1% relative error). The selection of pmin is quite facile, since our technique can effectively detect the watermark for very low embedding powers, so all our experiments used a value pmin=0.

Here we provide a solution for the structure preservation rights protection, by solving an instance of the Neighbor Preservation (NP) Rights Protection.

In general, it is desirable to find the largest p, pmin<p<pmax that guarantees neighbor preservation, since larger energies on the embedded watermark will provide a better detection and resilience to attacks. Additionally, to provide an even stronger embedded watermark, one may be willing to accept a small error in the NN classification for providing a stronger watermark. Thus, a generalized Neighbor-Preserving (NP) problem can be defined that can also accept an error tolerance threshold $\tau$, as follows.

NP Watermarking: Given dataset D, minimum threshold (pmin) and maximum threshold (pmax), find the largest p, pmin<p<pmax, such that after the watermark embedding, at most $\tau \cdot |D|$ watermarked objects $\hat{x}$ have changed their original nearest neighbor.

To solve the NP watermarking problem, a check of whether for a given trajectory x, its nearest neighbor NN(x) before the watermarking is still the same, or if there is another trajectory y that is closer than NN(x) after embedding. If we denote with $\hat{D}_p(x, y)$ the Euclidean distance between two trajectories x, y∈D after the embedding of a watermark with power p, we can state that x changed its neighbor if $\hat{D}_p(x, NN(x))>\hat{D}_p(x, y)$ holds for at least one trajectory y, y≠x, y≠NN(x). Equivalently, we can formulate the NP watermarking problem as the one of finding the largest power p, pmin<p<pmax, such that the number of trajectories x∈D that satisfy the inequality $\hat{D}_p(x, NN(x))>\hat{D}_p(x,y)$ is smaller than τ·|D|.

Solving this optimization problem for every pair of trajectories x,y can be very expensive, since it would require solving $O(|D|^2)$ inequalities, for counting how many trajectories lose their neighbor for any given power p. How to mitigate the computational expense of explicitly solving all the pairwise distance inequalities is addressed below.

Fast Algorithm: A faster algorithm can be realized by avoiding examining ranges of embedding powers for which no solution is possible. We assume that we can derive a closed form formula of the distance $\hat{D}_p^2(x, y)$ between two marked objects as a function of the embedding power p. If the distance used is the squared Euclidean distance, then the derivation is the following:

$$\hat{D}_p^2 = \|\hat{X} - \hat{Y}\|^2 = \|(1+pW) \times (X-Y)\|^2$$

We will use this parameterized distance function to calculate the largest power between $p_{min}$ and $p_{max}$ that guarantees neighborhood preservation.

Those skilled in the art can realize that one can derive a similar closed-form for most widely used distance functions. Examples of this invention can use other distance functions than the one illustratively described.

Figure 8:
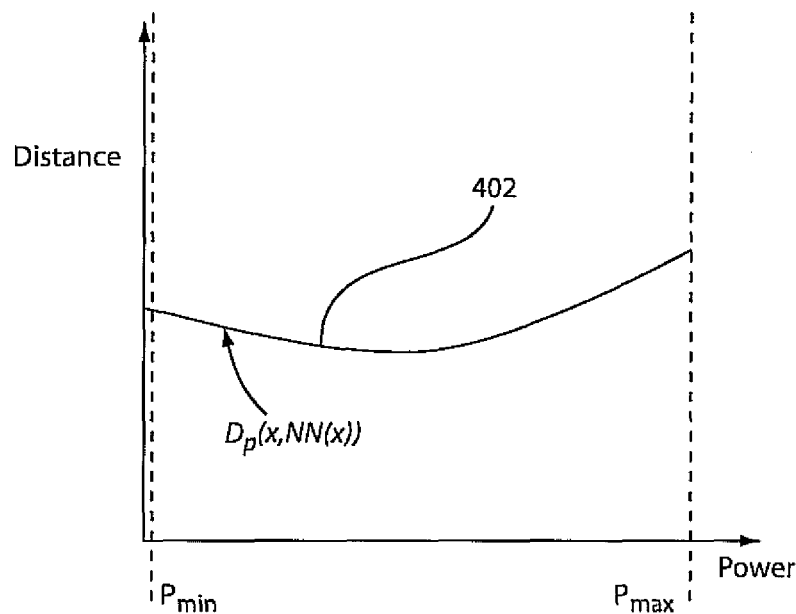
FIG. 8 is a plot showing a parameterized distance function with respect to a key embedding power (quadratic euclidean distance)

For any object x we denote its original nearest neighbor as NN(x). Their parameterized distance for any embedding power p is $\hat{D}_p^2(x, NN(x))$. Assume that we can visualize this function 402 over different powers of p as depicted in FIG. 8. In the case of the Euclidean distance this function 402 will be a parabola (quadratic function). In case of different distance functions, this function can be piecewise, or have any arbitrary form. However, as long as it can be expressed in a closed form, anything mentioned henceforth is also applicable.

Figure 9:
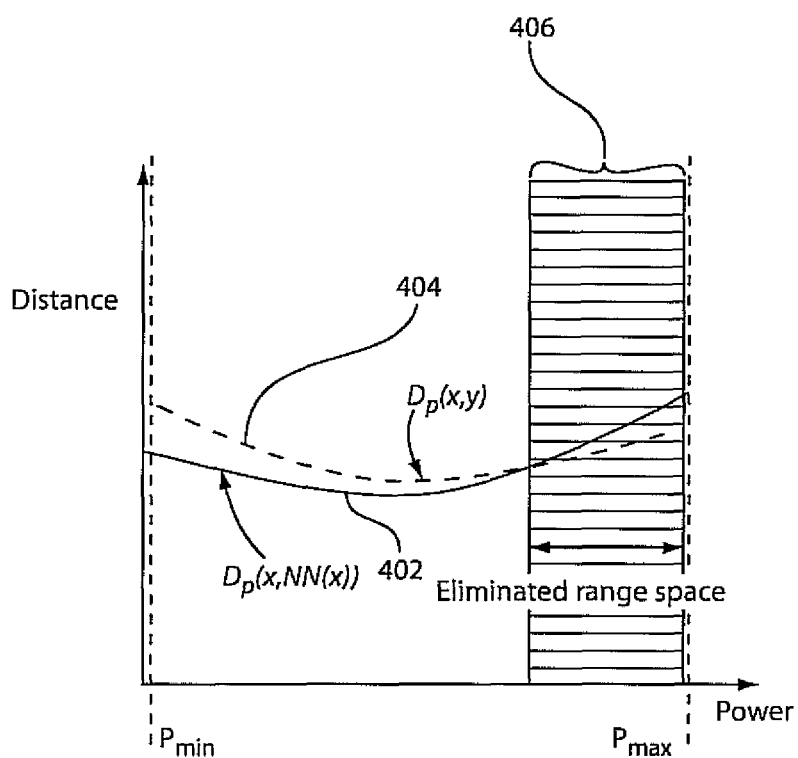
FIG. 9 is a plot showing a reduction of search space of FIG. 8 after comparison of the distance of an object x with an object y.

We want to find the maximum power $p_{max}$ such that: $\hat{D}_p(x, NN(x))>\hat{D}_p(x, y)$ for all y in the dataset, where y is different from x, and y is different than NN(x). We want to maintain the same nearest neighbor NN(x). If the above equation is violated for some powers, then we can remove these powers from examination on the next pair of objects that are examined. This procedure reduces the search space significantly. In FIG. 9, we compare $\hat{D}_p(x, NN(x))$ (function 402) with $\hat{D}_p(x, y)$ (function 404) and we show how a range of powers (region 406) are removed from further examination, since they violate the inequality that we wish to maintain (these power ranges introduce a new nearest neighbor).

Figure 10:
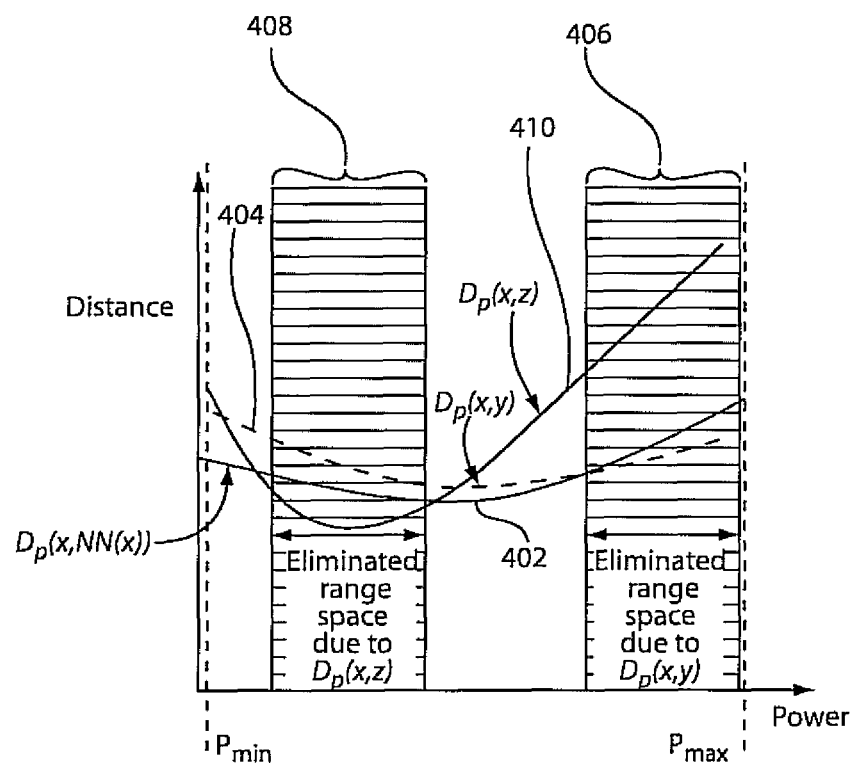
FIG. 10 is a plot showing a further reduction of search space of FIG. 8 after comparison of a distance of object x with object z.

In FIG. 10, more power ranges are removed when examining another pair of objects $\hat{D}_p(x, y)$ (function 410) by removing powers in region 408, and so on.

In the empirical evaluation section that follows, we demonstrate that the fast algorithm can be many orders of magnitude faster than the brute-force algorithm. One can also formally prove that the fast algorithm will return the same key embedding power $p_{max}$ as the naive exhaustive algorithm.

Experiments

We quantify the effectiveness of the Structure-Preserving Rights Protection for determining the appropriate key embedding power, so that the neighborhood of objects is not distorted. Additionally, for the power, we examined the resilience of the detection scheme under a number of potential attacks. We utilize various datasets to verify our findings which cover areas such as video tracking, handwritten data and image contours (Table 2).

TABLE 2

Characteristics of the datasets.

| Dataset | Obj. Length | # Objects | Type |
|---------|-------------|-----------|------|
| VT1 | 1500 | 15 | Video-Tracking |
| VT2 | 500 | 23 | Video-Tracking |
| Tablet | 90 | 128 | Handwritten |
| Skulls | 1500 | 16 | Image Contour |
| Leaves | 128 | 1125 | Image Contour |
| Fish | 256 | 247 | Image Contour |

Comparison of NP methods: We compare empirically the complexity of the Exhaustive Search and the Fast Search for different datasets. In Table 3, we also report the running times of the two methods. The use of the fast search allows for a significant reduction in the execution time, which is strongly dependent on the dataset size; the larger the cardinality of objects in the dataset, the larger the improvement gained by the Fast Search.

TABLE 3

Running times on different datasets (pmin = p0, pmax = $p_{10}^{-2}$, τ = 0). Speedup of fast search over the exhaustive search is also reported.

| Dataset | Exhaustive Search | Fast Search | Speedup |
|---------|-------------------|-------------|---------|
| VT1 | 15 sec | 0.4 sec | 38x |
| VT2 | 29 sec | 0.6 sec | 48x |
| Tablet | 6 min | 2.5 sec | 144x |
| Skulls | 44 sec | 0.5 sec | 88x |
| Fish | 86 min | 35 sec | 147x |
| Leaves | 2.2 days | 9.2 min | 344x |

Figure 11:
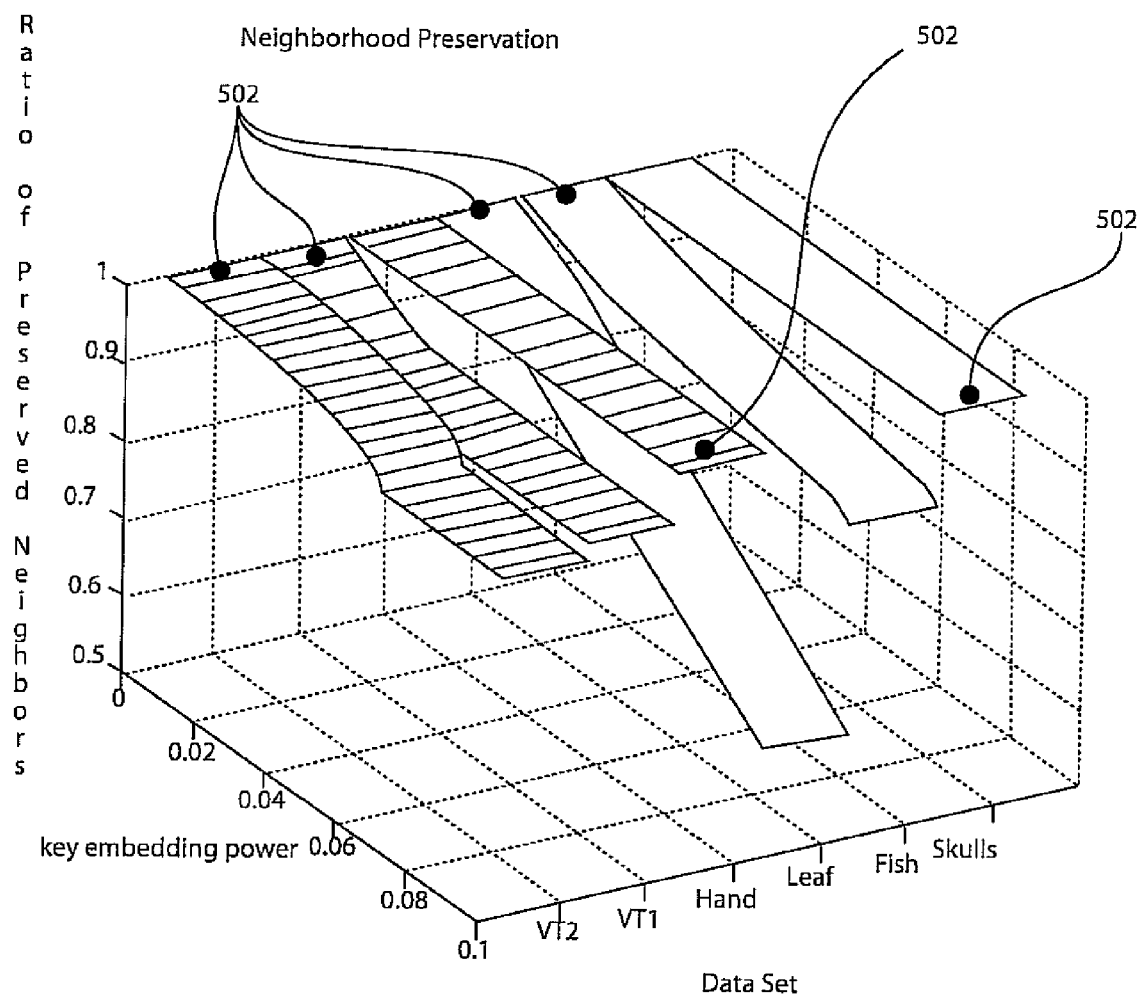
FIG. 11 is a graph showing preserved neighbors as a function of embedding power in six datasets where black dots indicate the embedding power returned by fast search which preserves all nearest neighbors.

Referring to FIG. 11, ratios of preserved neighbors as a function of the embedding power in the six datasets is illustratively shown. Black dots 502 indicate the embedding power returned by the fast search algorithm which preserves all nearest neighbors. In FIG. 11, a graphical view of the outputs of the methods is provided. We run the Fast Search asking for the largest power p, $p_0 < p < p_{10}^{-2}$ (so it induces at most 1% relative error on each trajectory) and changes at most τ=0% neighbor relationships. With a black dot 502, the power is denoted which the method returned so as 100% of the nearest neighbors are preserved. Both fast and brute-force methods return the same embedding power, so that all nearest neighbors of the dataset objects are retained, even after the watermark embedding procedure. Therefore, the datasets have not lost any of their usability.

Resilience to Attacks:

After determining a best watermark embedding power, watermark detectability was tested under various adversary attacks. These attacks attempt to transform the data with an ultimate objective of destroying the watermark, while at the same time not hindering significantly the dataset usability (e.g., the general shape of the object cannot be completely distorted). In each test the embedding power p utilized, is the maximum power that preserves the original neighbor of all the objects. We assume that the attacker retains all the objects (otherwise the neighborhood structure is distorted). The attacker, however, can modify the original objects/sequences.

Since we illustrate our findings with trajectories, we examine attacks specific to such type of data. We examine the effectiveness of the present watermarking methodology under five types of attacks.

Geometric Transformations, such as global translation or rotation of the objects, do not distort the shape of the trajectories (or change their relative position or distance), but may destroy a watermark if it is not embedded in the proper space. We constructed such attacks by watermarking the trajectories and then applying random translations, scalings and rotations on each of the objects (same geometric transformation on each one of them). The experiment is repeated 300 times and in Table 4 we report the average false positive/negative rates after each geometric transformation. Geometric attacks can potentially be harmful for watermarking schemes that embed the watermark on the original data domain. For our methodology, the high detectability of the watermark is guaranteed by the properties of the Fourier descriptors. In fact, for each of the datasets, false positive/negative rates are less than $10^{-10}$ and only present very minute changes, typically attributed to rounding errors.

TABLE 4

Geometric attacks. The detection of the watermark is perfect giving a false positive (negative) rate of virtually zero.

| dataset | no attack | translation | +scaling | +rotation |
|---|---|---|---|---|
| | | $P(FP) = P(FN)$ after | | |
| VT1 | $6.9^{-12}$ | $7.4^{-13}$ | $2.6^{-13}$ | $4.2^{-11}$ |
| VT2 | $5.3^{-12}$ | $5.8^{-14}$ | $1.0^{-12}$ | $2.1^{-10}$ |
| Tablet | $8.7^{-12}$ | $2.0^{-13}$ | $4.9^{-13}$ | $1.5^{-12}$ |
| skulls | $3.4^{-10}$ | $6.6^{-10}$ | $7.0^{-10}$ | $2.8^{-10}$ |
| fish | $4.1^{-14}$ | $1.6^{-14}$ | $2.6^{-14}$ | $2.0^{-15}$ |
| leaves | $2.8^{-14}$ | $2.5^{-13}$ | $3.0^{-14}$ | $1.1^{-14}$ |

Figure 12A:
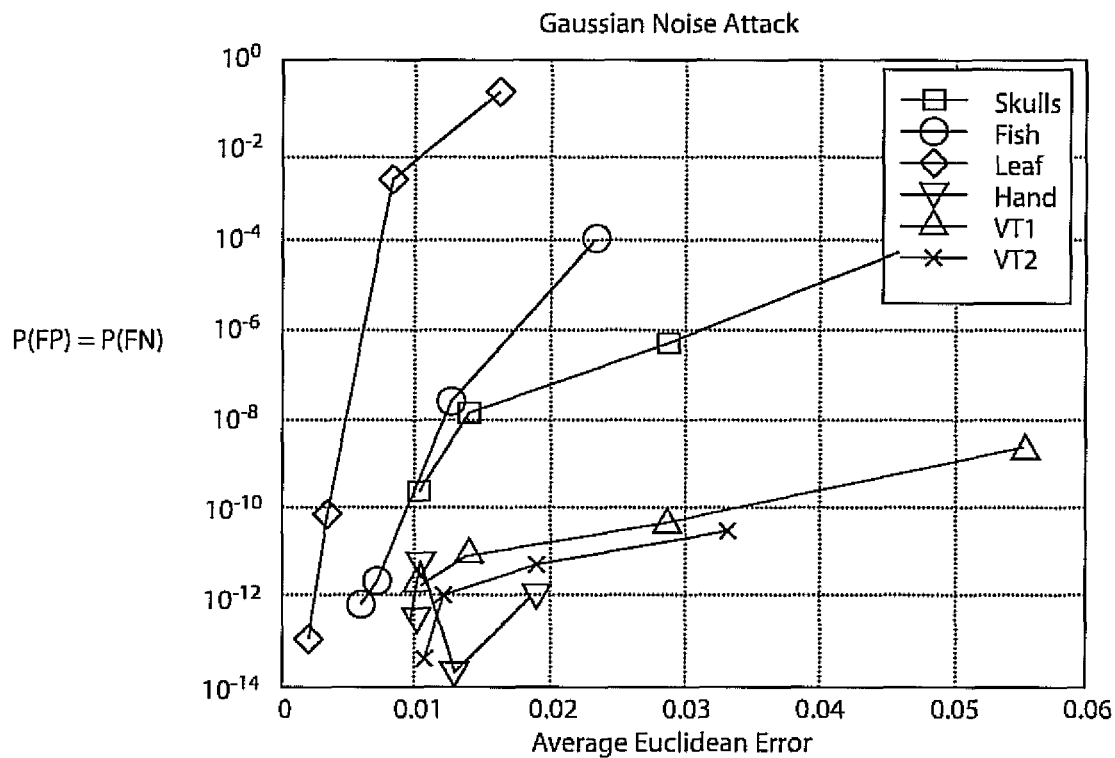
FIG. 12A shows resiliency against a Gaussian noise in time attack for six different data sets provided in accordance with the present principles.

Noise Addition is a more critical attack because it can potentially destroy the embedded watermark. For this attack, we translate all points of each trajectory using a vector whose coordinates are drawn by a normal distribution with mean 0 variance $\sigma$. Notice that the trajectories with a larger number of points, will be susceptible to a larger amount of noise. We repeated the experiment with increasing values of $\sigma$. In FIG. 12A, the results on the watermark detectability is plotted as a function of the average error introduced by the watermarking and by attacker. By increasing the value of $\sigma$ the total error introduced increases significantly. From FIG. 12A, it is apparent that the attacker will need to introduce a Euclidean error greater than 1%, or that he will introduce at least 10 times the error introduced by the watermarking (e.g., leaf dataset), thus destroying the nearest neighbor information, i.e. the utility of the dataset.

Figure 12B:
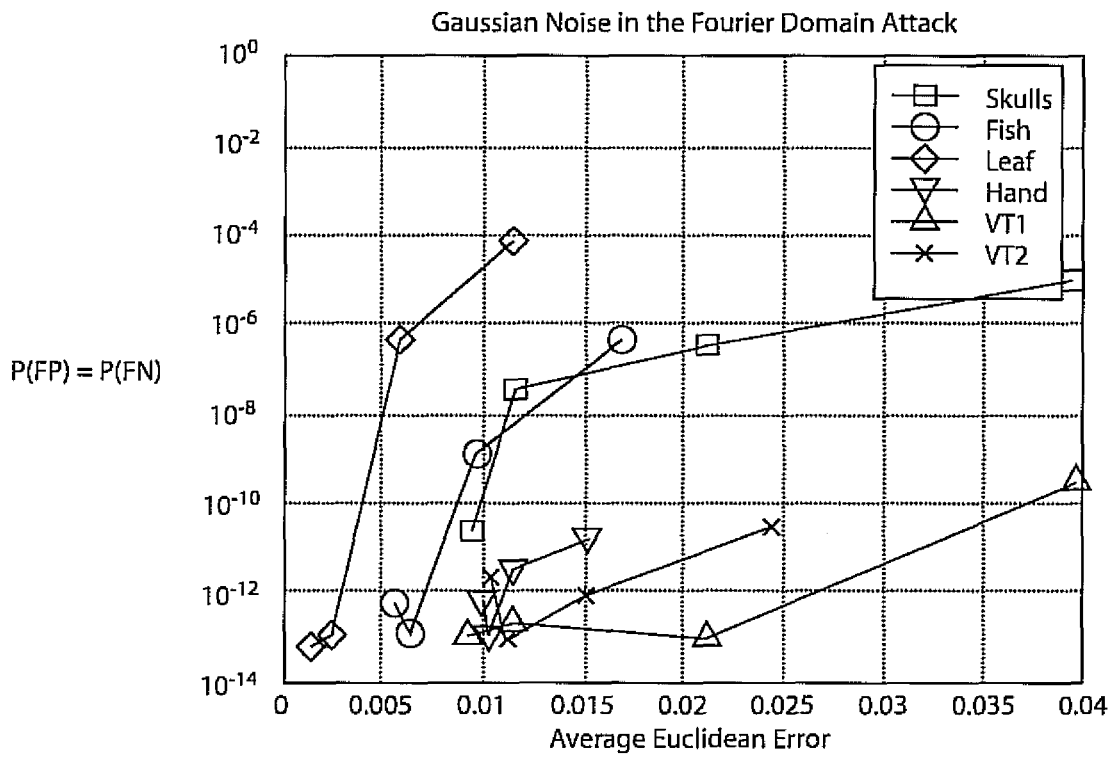
FIG. 12B shows resiliency against a Gaussian noise in time attack for six different data sets provided in accordance with the present principles.

An adversary may also add Gaussian noise in the frequency domain, which is where the watermark is embedded. The results for this attack are depicted in FIG. 12B. Again, a large amount of noise would need to be added which would destroy the dataset usability.

Figure 12C:
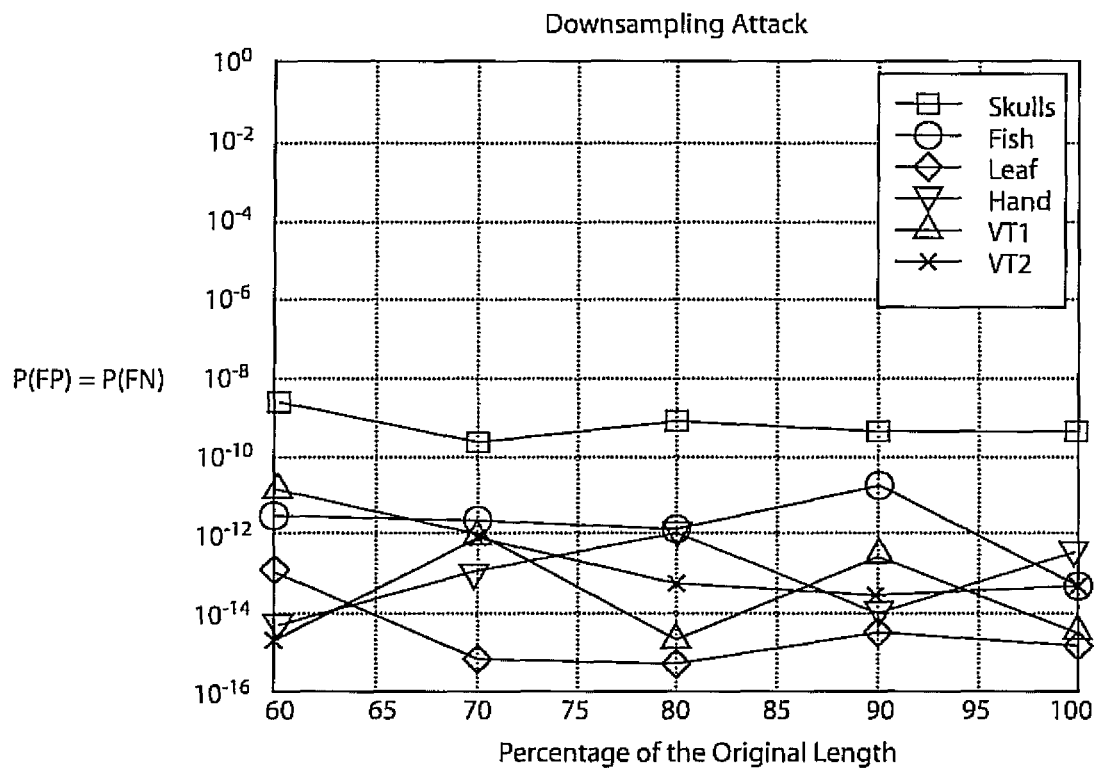
FIG. 12C shows resiliency against an upsampling attack for six different data sets provided in accordance with the present principles.

Downsampling:

On this attack each dataset trajectory is represented by smaller set of points that best approximate the original object. A shorter sequence is obtained by sampling equidistant points from the spline associated with the original sequence. Decimation is a significant attack, because even though it does not change significantly the shape of the trajectory, it allows the adversary to generate a new sequence which has no common points with the original sequence. In our tests (see FIG. 12C), even when resampling to half the length of the original trajectory, watermark detection is not affected.

Figure 12D:
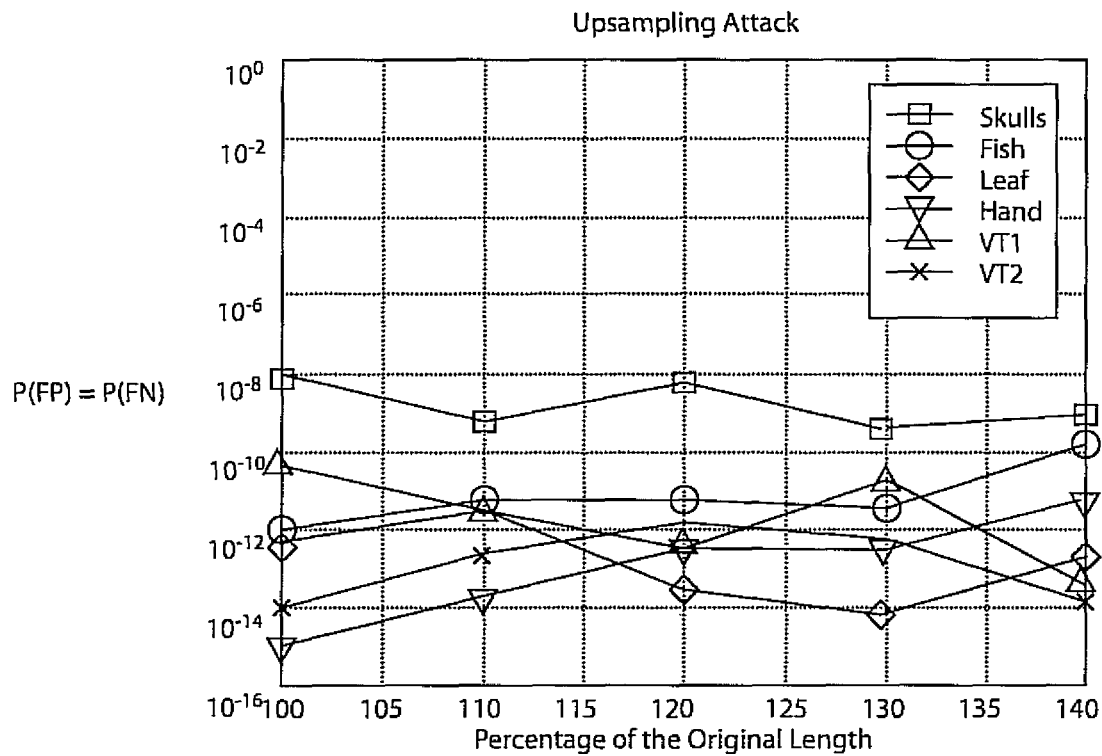
FIG. 12D shows resiliency against a downsampling attack for six different data sets provided in accordance with the present principles.

Upsampling:

similar to the downsampling attack, now the attacker approximates each trajectory with a longer sequence of points, again by sampling from spline associated with each trajectory. The results are reported in FIG. 12D) and show the resilience of the present principles to this type of attack.

Double Watermarking:

one can consider the situation where an attacker attempts to add their own watermark and claim ownership of the dataset. For this type of attack the legitimate owner can simply present the original dataset which includes neither watermark (which of course the attacker cannot present) effectively resolving the ownership problem. Notice, this is the single attack that requires the existence of the original dataset.

To summarize, with these experiments we have shown that the detectability of the embedded key is not hindered at all by geometric transformations (translations, rotations, scalings). Additionally, a malicious adversary would have to destroy the usability of the dataset (distort the trajectories significantly) in an effort to erase the hidden ownership key.

A watermarking technique that achieves Nearest Neighbor preservation is provided. An exhaustive search and a fast search algorithms that have been proven to return the same solution have been presented. Experimental results indicate that the fast search can be more than 2 orders of magnitude faster than the exhaustive solution, thus making the Neighborhood preservation operation tractable even for large datasets. Minimal visual distortion is introduced by the watermarking in accordance with the present principles, and it has been demonstrated with experiments, the robustness of the present embodiments under various attacks. Since the present methodology distorts objects, but maintains pairwise object relationships, it could also easily be extended for a wide group of distance-based mining operations, such as clustering or outlier detection. The present embodiments can mitigate researchers' concerns about sharing datasets, and therefore ease and enhance any collaborative experience.

Extensions and other types of Structural Preservation: The form of structural preservation through nearest neighbor preservation is also extensible to other types of neighborhood preservation, such as Minimum-Spanning-Tree preservation or dendrogram preservation. Our framework can be tailored to find the proper embedding power so that the output of each of these preservations does not change. In these cases, some additional constraints (besides the nearest neighbors) need to be enforced. Therefore, according to the underlying structure that one wishes to maintain, additional constraints can be enforced, which will properly guide the discovery of the key embedding intensity.

Figure 13:
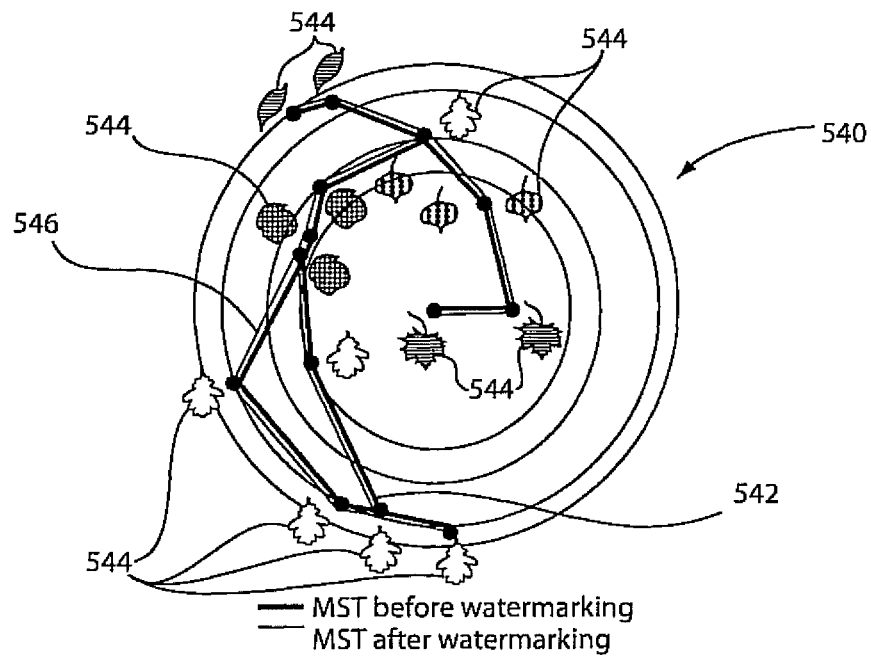
FIG. 13 is a diagram showing a minimum spanning tree preservation before and after watermarking in accordance with an illustrative embodiment.

Referring to FIG. 13, we provide an example of the Minimum-Spanning-Tree (MST) preservation 540 before and after the application of the proposed rights protection mechanism. An MST indicated by line 542 (dark line) is created on the original objects 544. An MST 546 with a lighter color line 548 is created on the objects 544 after the key embedding. The constraints enforced made sure that the MST did not change. As can be observed, for any practical purpose the two spanning trees are almost identical.

Figure 14:
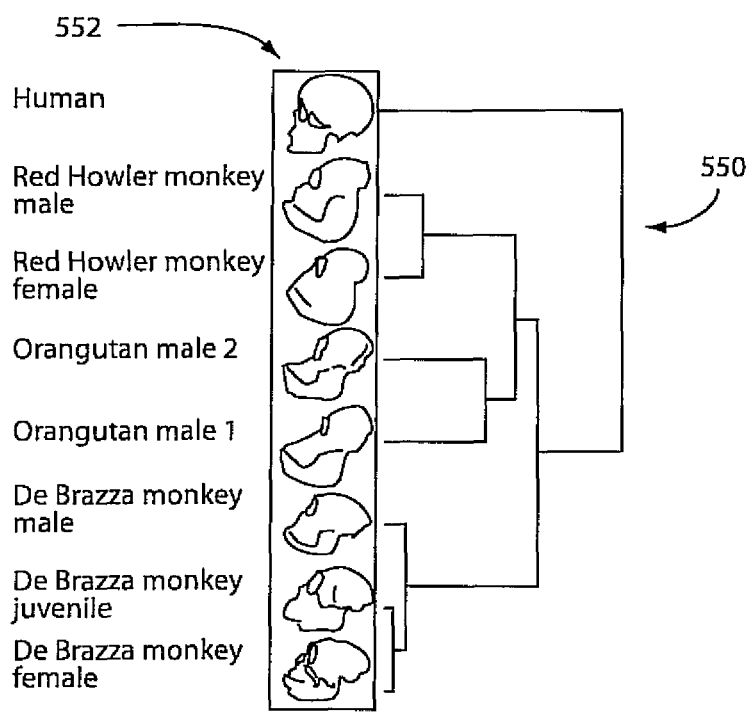
FIG. 14 is a diagram showing a dendrogram preservation in accordance with an illustrative embodiment.

Referring to FIG. 14, a derived dendrogram 550 on a set of image contours 552 after the structure-preserving rights protection mechanism is illustrative shown. We note that the dendrogram 550 was exactly the same on the original data, as well.

Many disciplines utilize dendrograms or spanning trees for visualizing relationships between objects; e.g. dendrograms are extensively used in biology and in bioinformatics. Also, in natural or anthropological sciences phenograms are typically employed for demonstrating the similarities between different species. Therefore, instances of the Structure-Preserving Rights Protection can very easily be used for providing guarantees on the visualization outcome of many algorithms, while at the same time providing a dataset protection mechanism. In general, the Structure-Preserving Rights Protection scheme can be useful in a variety of situations where we wish to maintain local structure/neighborhood of the objects in a dataset, while at the same time providing a robust mechanism for claiming the ownership of the dataset.

Other Applications:

Some areas and applications that collect or utilize high-dimensional sequence/trajectory datasets, where the present principles are applicable may include the following.

Video-Capture and Motion-Capture data are usually obtained after painstaking and often expensive recording sessions. Therefore, it is very important for the dataset creator to be able to provide palpable evidence regarding the legal ownership of the data. For such datasets, an attacker can rotate or translate the data without affecting their utility. Therefore, watermarked versions also need to withstand various transformations such as rotation, translation, and the like. The watermarking techniques presented can withstand similar geometric alterations.

GPS tracking applications are pervasive nowadays in many fields such as monitoring of motor- and air-traffic, and even cell-phone tracking. For such applications, watermarking techniques (which essentially add noise on the original dataset), could also be used for masking the exact positions of users, providing an initial level of privacy protection.

Multimedia data, such as handwritten data can be considered as trajectories since they record the position of strokes over time. Similarly, even datasets where no time is involved can be treated as trajectories. For example, images or shapes can be converted into 'trajectories', by extracting the shape perimeter and sequencing adjacent peripheral points. The techniques presented here can also be used for a plurality of 1-dimensional time-series datasets that exist in many data repositories.

In general, implementing the present principles may present additional challenges compared to traditional watermarking techniques, in the sense that one objective is different/more restrictive, because additional constraints of the neighborhood preservation on the watermarked objects is provided. While nearest neighbor preservation is considered herein, the problem formulation is distance based. Since most mining operations in a database of objects are strongly dependent on the use of a distance function (clustering, outlier detection, etc.), extensions to present solution can be applicable on an extensive gamut of mining and machine-learning algorithms, and Generic Time-Series Data Medical data (ECG, shapes), Anthropological data, DNA data, GPS tracking data, etc.

Figure 15:
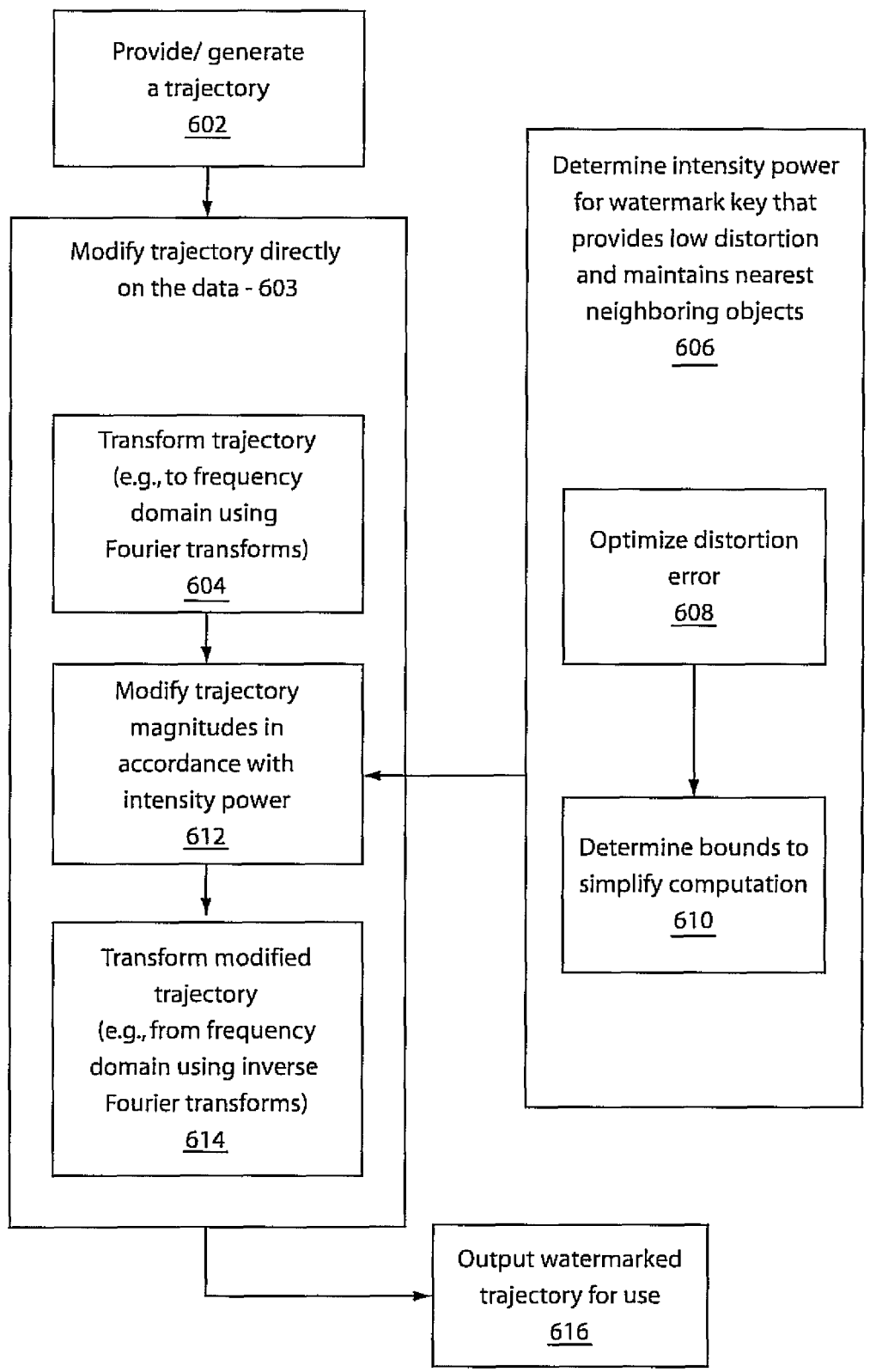
FIG. 15 is a block/flow diagram showing a system/method for marking and perturbing data in accordance with one illustrative embodiment.
Figure 16:
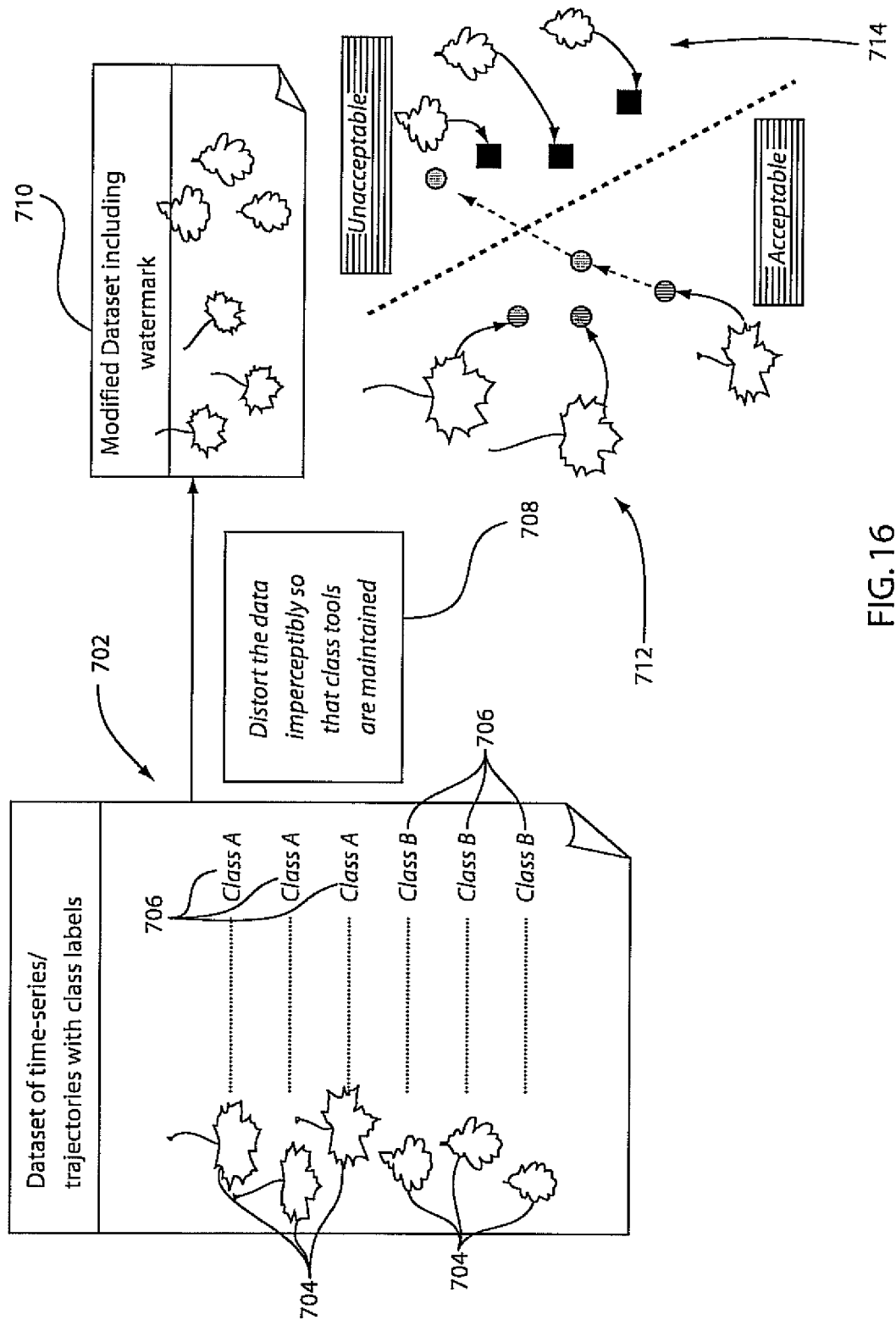
FIG. 16 is a diagram showing objects in a dataset with class labels preserved after embedding a key in accordance with the present principles.

Referring to FIG. 15, a block/flow diagram shows a system/method for marking and perturbing data while maintaining classification in accordance with an illustrative embodiment. In block 602, a trajectory is provided/generated for an object in a dataset, e.g., a data trajectory (which may include, a k-dimensional numerical sequence or other pattern or sequence). The trajectory may include at least one of handwriting, a data sequence, a perimeter of an image, a shape, one or two dimensional sequences or any other sequential data. The trajectory may be generated from a three-dimensional object, include a music, image etc. The object associated with trajectory includes at least one class. The object may be part of dataset or collection of objects and the objects include class labels and have neighbors. FIG. 16 illustratively depicts a collection or dataset 702 of objects (leaves 704) having class labels 706. FIG. 16 shows that the modified data set 710 distorted in block 708 maintains the nearest neighbors. The different classes 712 and 714 are preserved; however, it would be unacceptable if the leaves were reclassified.

In block 603, the trajectory is modified to provide a watermark directly on the perturbed data. In block 604, the trajectory is transformed into a different domain, e.g., a frequency or other domain. In the frequency domain magnitudes and phases for data in the trajectory are provided. The transforming to and from the frequency or other domain may employ Fourier and inverse Fourier transforms (wavelet transforms or other orthonormal transforms).

In block 606, an intensity power is determined for embedding a watermarking key in the trajectory. The intensity power is determined such that the watermark key is embedded (e.g., as meta-data) at frequencies with the highest energies, preferably based on magnitudes. The phases through each transforming are preferably maintained the same; however the phase may be altered as well or instead on the magnitudes. In block 608, the intensity power for embedding a watermarking key is determined by optimizing image distortion error to determine the power intensity. This ensures that the trajectory maintains its shape (class label, neighborhood, etc.) after being modified, e.g., distortion is minimized. The power intensity determination may be enhanced by bounding values of the intensity power to improve efficiency in computation (e.g., Fast Search) in block 610.

Determining the intensity power in this manner guarantees an original pair-wise relationship between nearest neighboring objects of an object associated with the trajectory does not change before and after embedding of the key. The nearest neighboring objects are based upon a distance measure, e.g., a Euclidean distance (or other linear and non-linear distances are possible)

In block 612, the trajectory is modified to embed the watermarking key at the magnitudes equal to or above the intensity power to provide a modified trajectory. In block 614, the modified trajectory is transformed from the frequency domain to provide a watermarked version of the trajectory. The modification is preferably imperceptible such that the image/trajectory appears the same before and after the modifying step and the class/class label of the trajectory is maintained.

In block 616, the trajectory includes a watermark that is impervious to attack and maintains its original identity to permit storage, transmission, coping or other processes without the fear of losing control over a data set by a content owner.

Having described preferred embodiments of systems and methods for rights protection of datasets with dataset structure preservation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for rights protection of a dataset that includes multiple trajectory objects, comprising:

determining an intensity power for embedding a watermarking key in a data trajectory; and modifying the data trajectory using a processor to embed a watermarking key at the intensity power such that the intensity power guarantees that an original pair-wise nearest neighbor relationship is maintained between distance-based neighboring objects before and after embedding of the watermarking key such that a modified trajectory provides a watermarked version of the data trajectory.

2. The method as recited in claim 1, wherein modifying includes imperceptibly modifying the data trajectory such that the data trajectory appears the same before and after the modifying step and class labels for objects are maintained.

3. The method as recited in claim 1, wherein the distance-based neighboring objects are based on nearest neighboring objects.

4. The method as recited in claim 1, wherein distance-based neighboring objects are based on a distance function.

5. The method as recited in claim 1, wherein embedding a watermarking key in a data trajectory includes embedding the watermarking key in a transformed domain.

6. The method as recited in claim 5, wherein the transformed domain includes a frequency domain and the watermarking key is embedded on magnitudes above the intensity power.

7. The method as recited in claim 1, wherein determining an intensity power for embedding a watermarking key includes optimizing image distortion error to determine the power intensity.

8. The method as recited in claim 1, further comprising bounding values of the intensity power to improve efficiency.

9. The method as recited in claim 1, wherein the data trajectory represents at least one of handwriting, a data sequence, a perimeter of an image, and a shape.

10. A non-transitory computer readable medium comprising a computer readable program for rights protection of a dataset that includes multiple trajectory objects, wherein the computer readable program when executed on a computer causes the computer to perform the steps of:

determining an intensity power for embedding a watermarking key in a data trajectory;

modifying the data trajectory to embed a watermarking key at the intensity power such that the intensity power guarantees that an original pair-wise nearest-neighbor relationship is maintained between distance-based neighboring objects such that a modified trajectory provides a watermarked version of the data trajectory.

11. A method for rights protection of datasets that include multiple trajectory objects while maintaining dataset structure, comprising:

providing a trajectory for an object in a dataset, the object being associated with at least one class;

transforming the trajectory into a frequency domain to provide magnitudes and phases for data in the trajectory;

determining an intensity power for embedding a watermarking key in the trajectory that guarantees that an original pair-wise nearest-neighbor relationship is maintained between nearest neighboring objects of an object associated with the trajectory before and after embedding of the watermarking key;

modifying the data trajectory using a processor to embed the watermarking key at the magnitudes equal to or above the intensity power to provide a modified trajectory; and transforming the modified trajectory from the frequency domain to provide a watermarked version of the trajectory.

12. The method as recited in claim 11, modifying includes imperceptibly modifying the trajectory such that the trajectory appears the same before and after the modifying step and the at least one class is maintained.

13. The method as recited in claim 11, wherein nearest neighboring objects are based upon a distance function.

14. The method as recited in claim 13, wherein the distance function includes a Euclidean distance.

15. The method as recited in claim 11, wherein transforming the trajectory into a frequency domain includes transforming the trajectory using a Fourier transform.

16. The method as recited in claim 11, wherein determining an intensity power for embedding a watermarking key includes optimizing image distortion error to determine the power intensity.

17. The method as recited in claim 11, further comprising bounding values of the intensity power to improve efficiency.

18. The method as recited in claim 11, further comprising maintaining the phases through each transforming step.

19. The method as recited in claim 11, wherein the trajectory represents at least one of handwriting, a data sequence, a perimeter of an image, and a shape.

20. A non-transitory computer readable medium comprising a computer readable program for rights protection of datasets that include multiple trajectory objects while maintaining dataset structure, wherein the computer readable program when executed on a computer causes the computer to perform the steps of:

providing a trajectory for an object in a dataset, the object being associated with at least one class;

transforming the trajectory into a frequency domain to provide magnitudes and phases for data in the trajectory;

determining an intensity power for embedding a watermarking key in the trajectory that guarantees that an original pair-wise nearest-neighbor relationship is maintained between nearest neighboring objects of an object associated with the trajectory before and after embedding of the watermarking key;

modifying the data trajectory to embed the watermarking key at the magnitudes equal to or above the intensity power to provide a modified trajectory; and transforming the modified trajectory from the frequency domain to provide a watermarked version of the trajectory.

* * * * *